US012566327B2

(12) United States Patent
Sánchez

(10) Patent No.: US 12,566,327 B2
(45) Date of Patent: Mar. 3, 2026

(54) SCANNING DEVICE WITH COATED MIRROR ELEMENT AND LASER PROCESSING HEAD HAVING THE SAME

(71) Applicant: Precitec GmbH & Co. KG, Gaggenau (DE)

(72) Inventor: David Blázquez Sánchez, Gaggenau (DE)

(73) Assignee: Precitec GmbH & Co. KG, Gaggenau (DE)

( * ) Notice: Subject to any disclaimer, the term of this patent is extended or adjusted under 35 U.S.C. 154(b) by 653 days.

(21) Appl. No.: 17/988,458

(22) Filed: Nov. 16, 2022

(65) Prior Publication Data

US 2023/0152575 A1 May 18, 2023

(30) Foreign Application Priority Data

Nov. 16, 2021 (DE) ...................... 10 2021 129 829.6

(51) Int. Cl.
*G02B 26/08* (2006.01)
*G02B 1/02* (2006.01)
*G02B 26/10* (2006.01)

(52) U.S. Cl.
CPC ............. *G02B 26/101* (2013.01); *G02B 1/02* (2013.01)

(58) Field of Classification Search
CPC ...... G02B 26/101; G02B 1/02; G02B 26/105; G02B 5/0825; G02B 5/0816; B23K 26/0643; B23K 26/082; B23K 26/00; B23K 26/064
See application file for complete search history.

(56) References Cited

U.S. PATENT DOCUMENTS

| | | | |
|---|---|---|---|
| 3,731,992 A | 5/1973 | Mansell | |
| 7,832,879 B2 | 11/2010 | Griffith et al. | |
| 2006/0276002 A1* | 12/2006 | Tandon | G02F 1/3523 |
| | | | 438/442 |
| 2019/0383978 A1* | 12/2019 | Takazane | G02B 5/0875 |
| 2020/0080231 A1 | 3/2020 | Cole et al. | |

FOREIGN PATENT DOCUMENTS

| | | |
|---|---|---|
| DE | 19955574 B4 | 7/2005 |
| DE | 102015216655 A1 | 3/2017 |
| DE | 102020112403 A1 | 11/2021 |
| EP | 0187400 A1 | 7/1986 |
| EP | 2607935 A1 | 6/2013 |
| EP | 2607935 B1 | 10/2014 |
| WO | 2005022209 A1 | 3/2005 |
| WO | 005022209 A1 | 5/2005 |

* cited by examiner

*Primary Examiner* — Euncha P Cherry
(74) *Attorney, Agent, or Firm* — DINSMORE & SHOHL LLP

(57) ABSTRACT

A deflection device for a laser machining head for deflecting a machining laser beam for machining a workpiece includes at least one mirror element which is deformable and/or is movably arranged in order to direct the machining laser beam to different positions on the workpiece. The mirror element includes at least one substrate and at least one reflective multilayer structure which is arranged on the substrate and in which a plurality of crystalline first layers having first refractive indices in a first range of values and a plurality of crystalline second layers having second refractive indices in a second range of values are arranged alternately one above the other. The first refractive indices of the crystalline first layers and the second refractive indices of the crystalline second layers are different from each other.

16 Claims, 3 Drawing Sheets

10

15

3

4

SCANNING DEVICE WITH COATED MIRROR ELEMENT AND LASER PROCESSING HEAD HAVING THE SAME

CROSS REFERENCE TO RELATED APPLICATIONS

This application claims priority to German Application 10 2021 129 829.6, filed Nov. 16, 2021, which is hereby incorporated by reference in its entirety.

FIELD OF THE INVENTION

The present invention relates to a deflection device for a laser machining head with a mirror element for deflecting a machining laser beam and for machining a workpiece, as well as a laser machining head comprising the deflection device.

BACKGROUND OF THE INVENTION

Laser systems with very high laser power are increasingly used in the technical field of laser material machining. This increases the demands on laser machining heads and the optical elements included therein, such as alternative mirrors or alternative mirror elements to heavy copper mirrors, since the high laser powers may result in high heat input into the optical elements. In particular, the demands on fiber-guided systems have increased in order to maintain this high level of performance.

In the case of systems and optical elements in laser machining heads that are not adapted to the requirements of high-performance lasers, it must therefore be expected that, after a short time, they will suffer from material fatigue due to high heat input, be damaged or even destroyed by the laser beam and have insufficient performance when laser machining a workpiece. In addition, the machining laser beam may be successively deflected or offset from the predetermined beam path by thermal drift in an optical element, which is difficult to control and compensate for. Due to the use of high-power machining lasers, the properties of the optical elements in laser machining heads must therefore be adapted in order to achieve satisfactory efficiency and performance.

A major challenge when adapting laser machining heads to high laser power lies in avoiding temperature increases on mirror surfaces. In the worst case, heating a mirror surface may limit the maximum laser power for material machining. The cause for the heating lies in the inherent properties, in particular the material properties of the mirror coatings. Depending on the materials used, a distinction may be made between metallic and dielectric coatings. Metal coatings are based on a highly reflective material such as aluminum, silver or gold that is deposited onto a substrate material. Due to the high degree of absorption of metal layers, such mirrors can only be used to a limited extent in systems in which a high light power density is used. Modern dielectric coatings, also called thin-film layers or interference layers, consist of thin layers of transparent alternating dielectric materials with widely differing refractive indices, such as $SiO_2$ and $Ta_2O_5$, which are deposited on a substrate. Essentially, their function is to modify the reflective properties of the surface by using the interference of the reflections of a plurality of optical layers. They may be used for highly reflective (HR) laser mirrors, for anti-reflective coatings (AR), for dichroic (treating different wavelengths differently) mirrors or thin-film polarizers.

The absorption in optical coatings and substrates is mainly determined by the band structure of the materials. Common dielectric materials such as oxides show band gaps greater than 3 eV, which correspond to absorption edges in the ultraviolet. As a result, the use of dielectric coatings may result in absorption in the ppm range. However, defects in the layers, for example due to impurities, may severely impair the absorption. Since dielectric coatings rely on optimizing constructive and destructive interferences at their interfaces to alter the reflective properties of the substrate surface, a key difference between anti-reflective and highly reflective coatings can be demonstrated. A typical transparent substrate such as fused silica has a reflectance of about 4% at perpendicular incidence. As a result, the number of interference layers needed to bring the value below 0.1% (AR coating) is much less than for increasing it above 99.9% (HR coating). While 3 to 5 dielectric layers are typical for AR coatings, more than 5 layers may easily be required for HR coatings. The increased complexity of HR coatings compared to AR coatings leads to a higher likelihood of contamination and structural defects that ultimately determine absorption and limit maximum laser power. In addition, amorphous dielectric materials have low thermal conductivity (of the order of 1 W/(m·K)), which limits heat transport and may lead to heat-induced structural damage in the coating and ultimately in the laser machining head.

Therefore, mirror coatings are a very critical component in a laser machining head and may limit the laser power of the machining laser beam. In particular, those mirrors for which a movable, for example rotatable, bearing makes coupling to a heat sink difficult or only low coupling to a heat sink possible suffer from the high energy input from the machining laser beam since the heat cannot be dissipated efficiently. This is particularly important in the case of deformable and/or movable or movably mounted mirrors since coupling to a heat sink is more difficult than for a stationary mirror.

In DE 199 55 574 B4, an additional cooling device coupled to the mirror is provided for a mass-optimized mirror for two- and three-dimensional laser surface machining of semi-finished products or finished products made of any materials and material combinations for laser machining with laser powers of up to 20 kW since, because the thickness of the mirror has been reduced to a minimum, self-cooling can no longer be guaranteed.

WO 2005022209 A1 discloses a mirror for a galvo deflection unit in a laser machining system. This mirror comprises a substrate which consists of a diamond material and may also consist of smaller diamond segments. The diamond substrate (10) has a high level of rigidity with a lower thickness than conventional mirror substrates, which enables higher operating speeds in the laser system.

U.S. Pat. No. 7,832,879 B2 describes an improvement in the heat management for deformable mirrors. A deformable mirror including a heat distributor used to evenly distribute thermal energy across the mirror is disclosed. Diamond material is a preferred heat distributor due to its extremely high thermal conductivity, which allows for rapid and uniform distribution of thermal energy in the mirror across the entire mirror surface, thereby increasing mirror life.

U.S. Pat. No. 3,731,992 A discloses a liquid-cooled laser mirror with a mirror structure and with a cover. Inside the mirror structure, there are multiple spiral grooves, while inside the cover, there are inlet and outlet ports. Liquid enters through the inlet ports of the cover, circulates through the spiral grooves, and exits through the outlet ports of the cover, thereby cooling the mirror.

The disadvantage of the approaches mentioned, however, is that the cooling systems are complex, take up space in the respective device and may lead to optical instabilities.

SUMMARY OF THE INVENTION

It is an object of the present disclosure to provide a deflection device including a mirror element, in particular a deformable and/or movably mounted mirror element, with improved and more efficient heat dissipation, in particular in the mirror coatings, and a laser machining head comprising the same.

Another object of the present invention is to provide a deflection device and a laser machining head comprising the same, said deflection device being configured to efficiently guide and/or deflect a machining laser beam with high laser power, e.g. more than 1 kW, onto a workpiece.

Furthermore, it is an object to provide a deflection device with improved thermal conductivity and a laser machining head comprising the same, said deflection device having a simple and compact structure.

One or more of these objects are solved by the subject matter disclosed herein. Advantageous and technically suitable embodiments are also disclosed.

According to an aspect, a deflection device for a laser machining head for deflecting a machining laser beam for machining a workpiece comprises: at least one mirror element that is deformable and/or movably arranged in order to direct the machining laser beam to different positions on the workpiece, wherein the mirror element includes at least one substrate and at least one reflective multilayer structure which is arranged on or above the substrate and in which a plurality of crystalline first layers and a plurality of crystalline second layers are arranged alternately one above the other. The crystalline first and/or second layers may be monocrystalline layers. The crystalline first layers each have first refractive indices that are in a first range of values. The crystalline second layers each have second refractive indices that are in a second range of values. The first refractive indices of the first layers and the second refractive indices of the second layers are preferably different from each other. In particular, each of the first refractive indices may be different from each of the second refractive indices. In other words, each first layer may have a different refractive index than any of the second layers or each second layer may have a different refractive index than any of the first layers. The first range of values preferably does not overlap with the second range of values. The first range of values and the second range of values are preferably spaced apart from one another. The first range of values may include, for example, refractive indices for high-reflection materials. The second range of values may include, for example, refractive indices for low-reflection materials.

Crystalline transparent materials have high thermal conductivity, which drastically reduces thermal stress in the coating and ultimately in the laser machining head. In particular, monocrystalline transparent materials have the highest purity and freedom from defects, resulting in even lower absorption values.

The deflection device has the advantage that the mirror element for deflecting a machining laser beam is also suitable for high laser powers of the machining laser, for example more than 1 kW or even more than 10 kW. The machining laser beam may therefore be deflected by the deflection device without the deflection device, in particular the mirror element, being damaged by the machining laser beam.

At least for a predetermined wavelength range, the mirror element has high reflectivity and can therefore reflect a high ratio of the incident light or the incident electromagnetic radiation of the machining laser beam. Due to the minimized or reduced absorption by the mirror element, the mirror element heats up little or not at all. As a result, excessive heating of the laser machining head or of elements arranged therein can also be largely avoided. Among other things, this means that the machining laser beam can be guided stably and precisely along a predetermined machining path or wobble pattern. A further positive effect is the extended operating life of the deflection device since damage in the course of usage or operation is reduced and therefore does not amount to major damage or even destruction over longer time intervals.

The multilayer structure may be highly reflective. Preferably, the first and second layers of the multilayer structure have widely differing refractive indices. For example, the first layers may have a high refractive index and the second layers may have a low refractive index. In other words, the first layers may each have a high refractive index and the second layers may have a comparatively low refractive index, or vice versa. Preferably, the first range of values for the refractive indices of the first layers and the second range of values for the refractive indices of the second layers are spaced apart from one another. A distance between the ranges of values may be about 0.5. The first range of values for the first refractive indices is preferably between about 1.8 and 5.5 and/or the second range of values for the second refractive indices is about between 1.2 and 4.6. A particularly large distance between the ranges of values of the first and second refractive indices is beneficial for the reflection properties of the multilayer structure.

In particular, the deflection device is configured to direct the machining laser beam to different positions on the workpiece or to deflect the machining laser beam in at least one direction, in particular in a direction perpendicular to the beam propagation direction of the machining laser beam, on the workpiece. The energy density of the machining laser beam on the workpiece may reach a value that is greater than 1 mJ/cm$^2$ (mill-joules per square centimeter). The deflection device is therefore particularly suitable for laser cutting, laser welding, laser soldering and/or laser build-up welding.

The mirror element of the deflection device is deformable, for example reversibly expandable, and/or movably arranged, e.g. pivotable or rotatable and/or displaceable. The machining laser beam can thus be directed to different positions on the workpiece by means of the movable and/or deformable mirror element, with the deflection preferably being carried out perpendicularly to the beam propagation direction.

The substrate preferably forms a support for the multilayer structure. The substrate may comprise two opposing main surfaces, which preferably form mutually parallel planes. One of the main surfaces may be referred to as an upper main surface and the other of the main surfaces may be referred to as a lower main surface. The multilayer structure is arranged on the upper main surface. The multilayer structure may have been formed by epitaxial growth on a base and transferred to the substrate. The lower main surface is a surface facing away from the upper main surface and thus from the multilayer structure. All layers of the multilayer structure may form substantially parallel planes with respect to the two planes of the main surfaces of the substrate. The first and second layers may be arranged alternately on top of one another or stacked in a direction perpendicular to the substrate surface or mirror surface.

The multilayer structure may be arranged immediately or directly, i.e. without an intermediate layer, on or above the substrate. Alternatively, the multilayer structure may be arranged indirectly, i.e. with an intermediate layer, on or above the substrate. The multilayer structure is reflective, in particular highly reflective. The higher the reflection properties of the multilayer structure, the fewer losses there are by transmission. A particularly highly reflective multilayer structure is therefore particularly preferred. The higher the number of crystalline layers, the more light can be reflected.

The multilayer structure comprises a plurality of first crystalline, in particular monocrystalline, layers with first refractive indices in a first range of values and a plurality of second crystalline, in particular monocrystalline, layers with second refractive indices in a different range of values, specifically in the second range of values. Monocrystalline means that a layer substantially and predominantly has only a single crystal structure, wherein it is possible that smaller defects are present in the layer. In particular, in a crystalline structure, there is substantially no amorphous structure. Crystalline or monocrystalline structures have particularly good thermal conductivity. The crystalline, in particular monocrystalline, first and second layers may preferably be grown epitaxially on top of one another on a semiconductor base. The semiconductor base is typically not the substrate used in the mirror element, but a semiconductor specially selected for the epitaxial growth. The multilayer structure is then typically detached from the semiconductor base and applied or arranged on the substrate. Alternatively, however, the semiconductor base also represents the substrate of the mirror element in some cases. The semiconductor base usually specifies the crystal structure during epitaxial growth, and the atoms that grow epitaxially follow this specification and preferably form the monocrystalline layer.

The first and the second layers are in particular arranged or grown directly one above the other so that they are in contact with one another. This creates an optical interface at the point of contact between two layers, where the incident light passes from an optically denser medium, namely the layer with a high refractive index or high refractivity, into an optically thinner medium, namely the layer with a low refractive index.

The multilayer structure may form a surface of the mirror element. In particular, one of the first or second layers may form the surface of the mirror element. In other words, one of the first or second layers may be exposed. Thus, preferably no further layer or element is arranged on the multilayer structure.

Preferably, the (highly) reflective multilayer structure is arranged directly on the substrate, in particular without an adhesive (coupling) layer between the multilayer structure and the substrate. In particular, the multilayer structure may be coupled to the substrate by means of van der Waals forces or by means of covalent bonds. The direct coupling of the multilayer structure with the substrate makes it possible to dispense with intermediate layers such as adhesion or adhesive layers. Such intermediate layers are difficult to reproduce, so that variations in the quality of the manufacture of such mirrors can hardly be avoided. In addition, intermediate layers may affect the optical properties of the mirror or impede the dissipation of heat. The multilayer structure is therefore preferably optically connected to the substrate without adhesives/solders or intermediate layers.

The first refractive indices of at least two or all of the first layers may be substantially the same. At least two or all of the first layers may consist of substantially the same material. At least two or all of the first layers may have substantially the same layer thicknesses. The first layers may have refractive indices similar to each other. The first layers may also be referred to as layers of the first type.

The second refractive indices of at least two or all of the second layers may be substantially the same. At least two or all of the second layers may consist of substantially the same material. At least two or all of the second layers may have substantially the same layer thicknesses. The second layers may have refractive indices similar to each other. The second layers may be referred to as layers of the second type.

Layers of the same type, i.e. first layers or second layers, which each have the same or similar refractive indices and/or materials and/or layer thicknesses, can be readily manufactured. The exact parameters for refractive indices and/or materials and/or layer thicknesses may be determined or simulated by software programs for optical arrangements. In order to achieve a desired reflectivity, refractive indices, material compositions and layer thicknesses for the layers of one type may even vary slightly, as long as the refractive indices of the layers of the first type are similar and the refractive indices of the layers of the second type are similar and the difference in the range of values or variance range of the refractive indices of the first type and the range of values or variance range of the refractive indices of the second type is large enough.

The substrate preferably comprises at least one of the following materials: silicon Si, fused silica $SiO_2$, aluminum oxide $Al_2O_3$, sapphire, diamond and silicon carbide (SiC). In particular, the substrate consists of one of these materials. The substrate layer thickness may be between about 1 mm and 15 mm. The substrate may be transparent or consist of transparent material.

Substrates with high thermal conductivity such as sapphire or silicon carbide are particularly suitable because they help to dissipate heat particularly efficiently. All of the materials mentioned are particularly suitable for coupling or connecting the multi-reflection layer to the substrate by means of covalent bonds or van der Waals forces. In addition, the materials can be machined very well and very smooth surfaces with low RMS roughness can be provided for the optimal connection of the multi-reflective layer. The optical properties of these materials are also well known and particularly suitable for the use of the usual machining lasers. In particular, those substrates are suitable which also include the materials mentioned and are transparent for a predetermined wavelength range and/or have coefficients of expansion similar to those of the multilayer structure in order to prevent stress in the mirror element.

The first layers and/or the second layers preferably consist of a semiconductor and/or include at least one of the following materials: binary and/or ternary and/or quaternary compounds of III-V semiconductors and/or II-VI semiconductors and/or aluminum gallium arsenide $Al_xGa_1As$ with a variable aluminum content.

The materials mentioned can be grown particularly well epitaxially in stacked crystalline layers on a base, resulting in a crystalline multilayer structure. The purity of the material leads to the growth of homogeneous crystals, which are particularly suitable for conducting and accordingly dissipating heat.

The first and/or second layers may include aluminum gallium arsenide, i.e. $AlxGa_{1-x}As$, where $0<x<1$. Here, x may be smaller for the layer of one type than for the layer of the other type. For example, x may be smaller for the first layers than for the second layers. A high x leads to a low refractive index. The variable content of aluminum in the first and/or second layer ensures high reflection properties.

The higher the differences in the aluminum content in the layers of the two types, the higher the reflectivity of the multilayer structure may be. Due to a high difference in these Al contents, a smaller number of layers may therefore be required in order to achieve high reflectivity.

The multilayer structure may have a thermal conductivity of more than 5 W/mK and/or an absorption at a machining laser wavelength of less than or less than 10 ppm.

A thermal conductivity of more than 5 W/mK and/or an absorption, e.g. at a wavelength of the machining laser, of less than 10 ppm is/are well suited when using high-power lasers, since the possibly generated heat, which despite the high reflection properties of the multilayer structure or the multilayer sheets cannot be prevented, can be efficiently dissipated.

At least one of the second layers, which is preferably monocrystalline, may be grown epitaxially on one of the first layers, which is also preferably monocrystalline. In particular, at least one of the first layers is grown epitaxially on one of the second layers and/or vice versa. All of the first and second layers are preferably grown epitaxially on top of one another.

The epitaxial growth may be carried out using at least one of the following methods: molecular beam epitaxy (MBE), metal-organic vapor phase epitaxy (MOVPE), liquid phase epitaxy (LPE) and any other method that is suitable for this. For the epitaxial growth of layers on a base, the following materials, for example, are suitable for the base, in particular with high purity: GaAs, Ge, InP, GaN/AlN. After the growth of the epitaxial layers on the base and the formation of the multilayer structure, the multilayer structure may be removed or detached from the base and the multilayer structure may be transferred to the substrate. The following methods may be used for this purpose, for example: wet coating, dip coating, spin coating, etc. A step of heating or tempering the multilayer structure may then be carried out.

The great advantage of this concept is that semiconductor fabrication is a mature technology where epitaxial growth of crystals is a routine task, resulting in multilayer stacks with the highest purity and free from structural defects. The right choice of semiconductor materials and stack design enables the production of coatings with the necessary low absorption in the ppm range. In particular, the absorption of crystalline highly reflective coating for the wavelength of the machining laser beam may be below 10 ppm. The crystalline or monocrystalline structure of the layers results in significantly higher thermal conductivity compared to dielectric materials. In particular, the thermal conductivity of the crystalline highly reflective coating may be more than 5 W/mK. Since epitaxial growth is usually performed with semiconductors as base, techniques maybe used to remove the actual mirror structure, i.e. the multilayer structure, from the base and bond it to the substrate, such as a fused silica substrate.

The multilayer structure preferably comprises more than 5, in particular more than 10 and preferably more than 20 first and second layers, for example more than 10 pairs of one of the first and one of the second layers. The multilayer structure may have a total thickness of more than about 0.5 μm, in particular more than 1 μm, preferably more than 5 μm. The layer thicknesses of the first and/or second layers may be several nanometers and in particular between about 20 nm and about 200 nm. The layer thickness of each individual layer may be, in particular, about 50 nm.

The more layers there are in the multilayer structure, the higher the values that can be obtained for the reflectivity, i.e. the higher the degree of reflection. A number of more than 5 layers is therefore particularly advantageous in order to be able to produce a mirror with high reflectivity. For example, there may be between 100 and 120 layers in the multilayer structure.

The multilayer structure is preferably configured to reflect a maximum proportion of an incident electromagnetic radiation in a predetermined wavelength range. The multilayer structure may have an absorption in at least one predetermined wavelength range of less than about 50-100 ppm, in particular less than about 10 ppm, and preferably less than about 1 ppm.

In the case where a maximum possible proportion of the incident light of a machining laser beam can be reflected, the absorbed proportion of the incident light is reduced, in particular to achieve less than about 50-100 ppm, and consequently the heat input can be reduced.

The multilayer structure can have a reflectivity in at least one predetermined wavelength range of at least about 99.0%, preferably at least about 99.5% and particularly preferably at least about 99.9%, in particular about 99.99%.

The at least one predetermined wavelength range may correspond to at least a partial range between about 900 nm and 1100 nm and/or between about 450 nm and 750 nm. The predetermined wavelength range may correspond to a range of machining laser wavelength ±25 nm, preferably ±10 nm. These wavelength ranges correspond to the usual wavelength ranges of machining lasers.

The mirror element may further comprise at least one additional mirror coating. In other words, the substrate may be coated on at least one side or have an additional mirror coating on at least one side or surface. As a result, the reflectivity of the mirror element can be optimized for at least one additional wavelength when the multilayer structure is optimized for maximum reflectivity and/or minimum absorption for the wavelength of the machining laser beam. The at least one mirror coating may comprise at least one dielectric and/or at least one metallic layer. The at least one mirror coating may consist, for example, of at least one metal layer made of gold and at least one dielectric layer made of SiO$_2$. The mirror coating may consist, for example, of exactly one metal layer made of gold and exactly one dielectric layer made of SiO$_2$. This last layer also partly serves as a protective layer for these sensitive metal layers. The at least one mirror coating may be arranged between the multilayer structure and the substrate and/or on a surface of the substrate that faces away from the multilayer structure. The at least one mirror coating is preferably reflective for a different wavelength range than the multilayer structure. For example, the at least one mirror coating may be reflective (mainly) for a wavelength range of a pilot laser and/or for a wavelength range of a process radiation to be detected for process monitoring, while the multilayer structure may be reflective (mainly) for the wavelength range of the machining laser.

The dielectric and/or the metallic mirror coating may at least partially reflect electromagnetic radiation in a wavelength range which is not reflected or not completely reflected by the multilayer structure. In particular, incident light of such wavelengths may be reflected by the additional mirror coating(s) for which the multilayer structure does not have highly reflective properties. As a result, a mirror element capable of reflecting light in a wide spectrum of wavelengths can be provided. In particular, the broadest possible spectrum in the visible and in the infrared range, in particular in the near-infrared range, should be reflected in order to reduce heat input. The reflectivity of the entire mirror element can be improved over a large wavelength range, in particular from about 400 nm to about 1200 nm. The wavelength ranges in which the multilayer structure has high reflective properties or reflection properties and the wavelength ranges in which the mirror coating(s) has/can have reflective or even high reflective properties overlap.

The mirror coating may be arranged between the bottom layer of the multilayer structure and the substrate, e.g., the upper main surface of the substrate, and/or on the lower main surface of the substrate. The mirror coating may be applied to the substrate by, for example, thermal vapor deposition, sputtering, spin coating, dip coating, epitaxial growth, or other methods suitable for application to the substrate. Metallic materials suitable for additional mirror coatings are, for example, gold, silver, aluminum. Dielectric materials suitable for additional mirror coatings are, for example, oxides such as $SiO_2$, $TiO_2$, $HfO_2$, $Al_2O_3$. The layer thickness of such a mirror coating may be between about 20 nm and about 2000 nm.

The deflection device preferably comprises at least one drive device configured to deform the at least one mirror element in order to rotate and/or laterally displace or offset at least one axis. In this case, the mirror element may be arranged on a suspension coupled to the deflection device. Dissipation of heat may be effected at least partially by suspending the mirror element on a heat sink, for example on a metal part. The drive device may include at least one actuator, a piezoelectric actuator, a voice coil actuator, a galvo actuator and/or a microelectromechanical system (MEMS). The deflection device may be a galvo scanner or a mirror scanner including the at least one mirror element in order to deflect the machining laser beam in two mutually perpendicular directions on the workpiece. The at least one mirror element may be rotatable about at least one axis, preferably about two axes which are at an angle to one another. The deflection device preferably comprises at least two mirror elements. Each mirror element may have its own drive device assigned.

The mirror element may be deformable at least partially reversibly so that an actuator configured to deform the mirror element does not destroy it.

The deflection device may therefore represent a scanner of a laser machining head or at least a part of the scanner. The drive device is configured to deflect the machining laser beam to different positions, in particular along a predetermined path on a workpiece and, for example, to scan a surface or the path on the workpiece.

According to a further aspect, a laser machining head for machining a workpiece which comprises the deflection device according to one of the embodiments described herein is provided.

According to a further aspect, a laser machining head for machining a workpiece comprises a coupling device for coupling a machining laser beam into a beam path of the laser machining head, at least one lens or lens system for focusing the machining laser beam onto the workpiece and at least one mirror element for deflecting the machining laser beam. The mirror element comprises at least one substrate and at least one reflective multilayer structure which is arranged on the substrate and in which a plurality of crystalline first layers with first refractive indices in a first range of values and a plurality of crystalline second layers with second refractive indices in a second range of values are arranged alternately one above the other or on top of one another. The first refractive indices of the first layers and the second refractive indices of the second layers are preferably different from each other. In particular, each of the first refractive indices may be different from each of the second refractive indices. In other words, each first layer may have a different refractive index than any of the second layers or each second layer may have a different refractive index than any of the first layers. The first range of values preferably does not overlap with the second range of values. In other words, the first and second ranges of values may be spaced apart from one another.

The coupling device may be a fiber coupler, for example, in order to couple a laser optical fiber to the laser machining head.

The mirror element may be movably arranged and/or be deformable in order to traverse and/or scan a predetermined path on the workpiece with the machining laser beam. A surface of the multilayer structure may be arranged to be freely accessible or exposed in the laser machining head. In other words, the mirror element may be configured or arranged in such a way that the machining laser beam is incident or impinges directly on a surface of the multilayer structure or on one of the first or second layers.

Preferably, the laser machining head comprises the deflection device according to a described embodiment, wherein the at least one mirror element of the laser machining head is the at least one mirror element of the deflection device.

The drive device may include an actuator, in particular a piezoelectric actuator, galvo actuator or galvo scanner, a voice coil actuator and/or a microelectromechanical system, MEMS. The mirror element may comprise or be a galvo mirror.

In particular, fiber lasers may be used as machining lasers. The wavelength of typical machining lasers is around 1 µm. The fiber diameter may be about 100 µm. The laser power may in particular be more than 1 kW.

All of the described embodiments of the deflection device can be combined with or implemented in the laser machining head. All of the described advantages that result for the embodiments of the deflection device also apply in particular to the laser machining head when these embodiments are implemented therein.

BRIEF DESCRIPTION OF THE DRAWINGS

The invention is described in detail below with reference to the drawings.

DETAILED DESCRIPTION OF THE INVENTION

In the following, the same reference symbols denote elements that are the same or have the same effect, and a repetitive and therefore redundant description of these elements was omitted.

Figure 1:
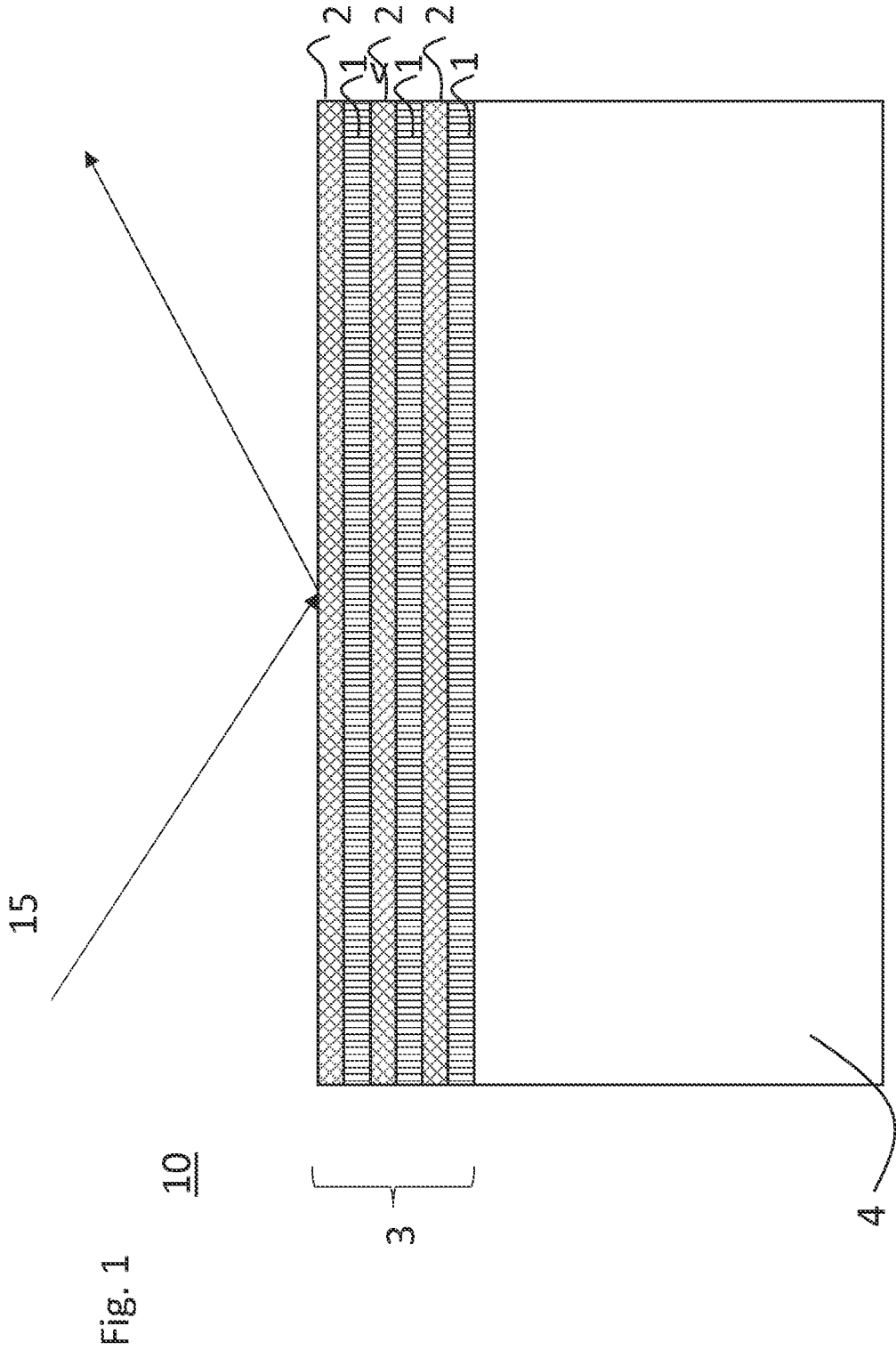
FIG. 1 is a schematic diagram of a mirror element having a reflective multilayer structure according to an embodiment.

FIG. 1 is a schematic diagram of a mirror element 10 having a reflective multilayer structure 3 according to an embodiment. A substrate 4 forms the support for the multilayer structure 3 which is applied directly to the substrate 4. The substrate 4 may in particular comprise fused silica, sapphire or silicon carbide and in particular consist entirely thereof. In this example, the multilayer structure 3 has a total of six layers consisting of a plurality of first layers 1, i.e. layers 1 of the first type, and a plurality of second layers 2, i.e. layers 2 of the second type. In FIG. 1, only three first layers 1 and three second layers 2 are shown, i.e. three pairs of layers 1, 2 of the first and second types. However, there are preferably a total of at least twenty layers, i.e. at least ten pairs of layers 1, 2 of the first and second types. The surface of the multilayer structure 3 is exposed so that a machining laser beam 15 is directly incident on one of the first or second layers 1, 2. For the sake of completeness, it is noted that the reflection of the machining laser beam 15 at the multilayer structure 3 is shown only schematically in FIG. 1. Of course, not only the top layer of the multilayer structure 3 contributes to the reflection, but also the underlying layers 1, 2.

The first layers 1 may be layers with a high refractive index, for example, i.e. layers with a high refractive index or high refractive indices, and the second layers 2 may be layers with a low refractive index or low refractive indices. The relative terms high and low are based on the comparison between the layers of the first type and the layers of the second type. The first layers 1 therefore each have a refractive index that is higher than the refractive index or the refractive indices of the second layers 2. It may of course also be the other way around, so that the first layers 1 each have a refractive index that is lower than that of the second layers 2 The first and second layers 1, 2 are each preferably monocrystalline semiconductor layers.

When the mirror element 10 is used as intended, the side on which the multilayer structure 3 is arranged is the side on which the light is incident. The machining laser beam 15 is therefore incident on the multilayer structure 3 "from above", i.e. does not initially pass through the substrate 4. As explained above, the path of the machining laser beam 15 is shown only schematically in FIG. 1. However, it is not shown in detail how the path of the machining laser beam 15 extends in detail through the multilayer structure 3 with refraction or reflection at the individual layers 1, 2.

Figure 2:
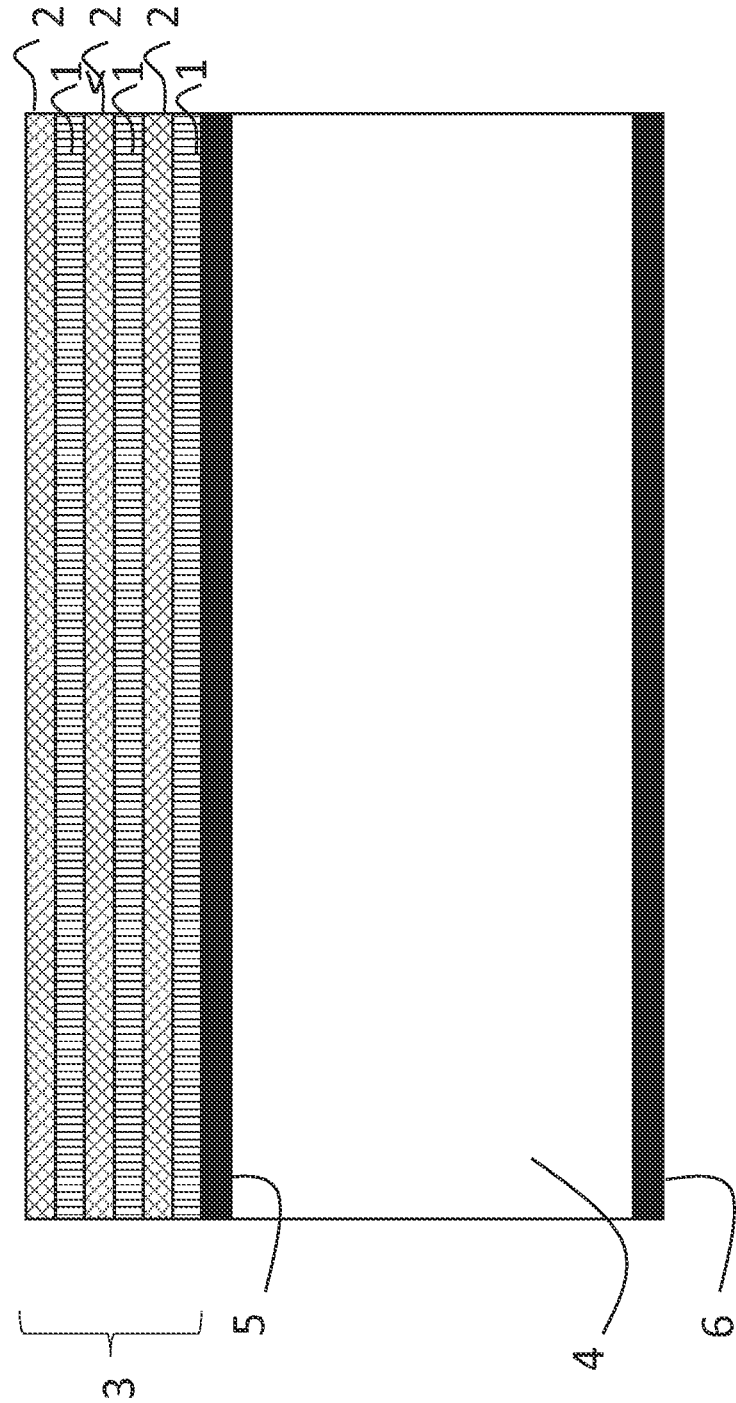
FIG. 2 is a schematic diagram of a mirror element having a reflective multilayer structure according to another embodiment.

FIG. 2 is a schematic diagram of a mirror element 10 having a reflective multilayer structure 3 according to another embodiment. The mirror element 10 includes a mirror coating 5 between the multilayer structure 3 and the substrate 4. Furthermore, the mirror element 10 includes a mirror coating 6 on the substrate back side, i.e. the back side of the substrate 4. The back side or substrate back side is characterized in that it forms a lower main surface, i.e. a surface facing away from the multilayer structure 3, of the substrate 4. Otherwise, the other elements correspond to those shown in FIG. 1. The mirror element 10 in FIG. 1 is therefore the same as the mirror element 10 in FIG. 2 except for the additional mirror coatings 5, 6. Further alternative embodiments, which are not explicitly shown here, only have one of the two mirror coatings 5, 6.

The mirror coating 5 and/or the mirror coating 6 may comprise a dielectric and/or a metallic layer. Materials such as silver, gold, aluminum, silicon oxide or other oxides are particularly suitable. The mirror coating 5 and/or the mirror coating 6 may preferably be reflective for a different wavelength range than the multilayer structure 3. When the multilayer structure 3 is reflective for a predetermined wavelength range, then it may be the case that it is in turn transparent or only insufficiently reflective for another wavelength range. However, in order to also adequately reflect radiation of other wavelength ranges, at least one of these mirror coatings 5, 6 may be arranged in the mirror element 10, as shown in FIG. 2. The substrate 4 is generally and substantially transparent for a large number of wavelength ranges. This has the advantage that electromagnetic radiation is reflected in a particularly broad band with the mirror element 10 of FIG. 2 in comparison with the mirror element 10 of FIG. 1, while the heat input into the mirror element is similar in both cases.

In particular, the mirror coatings 5 and/or 6 may be applied to the substrate 4 by vapor deposition, sputtering or other known coating methods (thin film coating). Furthermore, an intermediate layer may be applied between the substrate 4 and the respective mirror coating 5, 6 to improve the adhesion properties.

Figure 3:
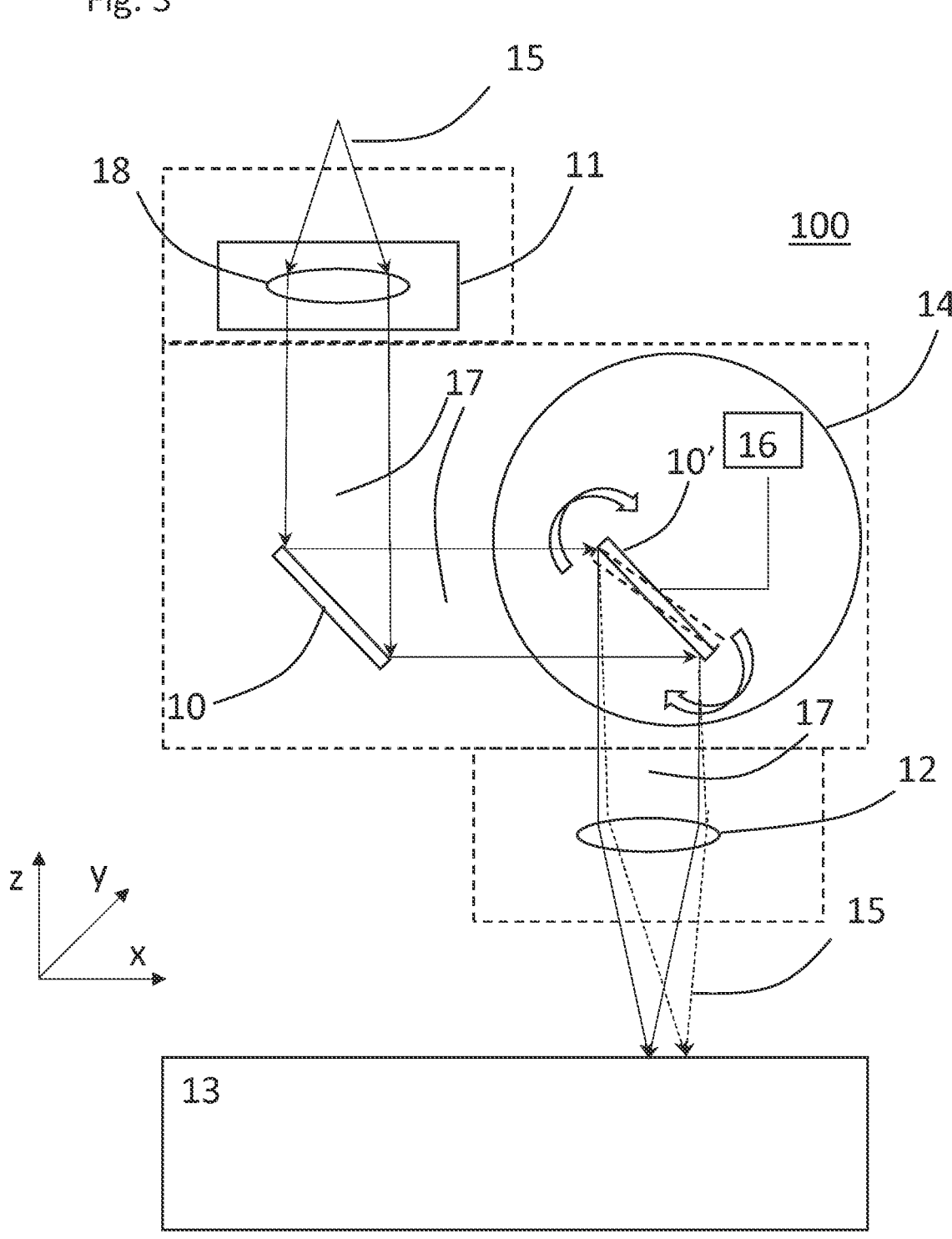
FIG. 3 is a schematic diagram of a laser machining head comprising a mirror element having a reflective multilayer structure according to an embodiment.

FIG. 3 is a schematic diagram of a laser machining head 100 comprising a mirror element 10 having a reflective multilayer structure 3 according to an embodiment.

The laser machining head 100 defines a beam path 17 along which the machining laser beam 15 travels in the indicated arrow direction. The laser machining head 100 comprises a coupling device 11, such as a fiber coupler, a lens 18 for collimating the machining laser beam 15, and a focusing optics 12, in particular a lens for focusing the machining laser beam 15 onto a workpiece 13.

The machining laser beam 15 may be provided by a fiber laser, for example, the wavelength being about 1 μm, the fiber diameter about 100 μm, and the laser power greater than 1 kW. The laser machining head 100 comprises two mirror elements 10, 10', of which the second mirror element 10' is movable in the present case. The first mirror element 10, on which the machining laser beam 15 is incident in the beam path 17, is fixed or stationary in the beam path 17 in FIG. 3. Alternatively, the first mirror element 10 may also be movable, e.g. displaceable in one of the spatial directions x, y, z or mounted so as to be rotatable about at least one axis. The second mirror element 10' on which the machining laser beam 15 is incident in the beam path 17 is mounted so as to be rotatable about at least one axis, preferably about two axes arranged at an angle to one another, which is indicated by the two curved arrows. However, the second mirror element 10' may, for example, also be linearly displaceable in one of the spatial directions x, y, z. The movable mounting of the mirror elements 10, 10' serves to displace the machining laser beam 15 on the workpiece 13 so that, for example, a predetermined way or path on the workpiece 13 can be scanned.

In the embodiment shown in FIG. 3, the second mirror element 10', which is rotatably mounted, is part of a deflection device 14 for deflecting the laser beam 15 on the workpiece 13. The deflection device 14 may also be referred to as a scanning device or scanner. The deflection device 14 further comprises a drive device 16 configured to move or deform one of the two mirror elements 10, 10' or both mirror elements 10, 10'. According to the embodiment shown in FIG. 3, the drive device 16 is configured to rotate or pivot the second mirror element 10' connected thereto about at least one axis. The drive device 16 may be an actuator, for example, which can vary the relative focal position of the machining laser beam 15. The at least one actuator may vary the focal position in at least one of the spatial directions x, y, z indicated by arrows in FIG. 3. The deflection device 14 with the actuators may include, for example, galvo mirrors, piezos, MEMS elements with semiconductor substrates and/or voice coil actuators. The actuators may move the mirror elements 10, i.e. displace and/or rotate them, or deform them in the case of deformable mirror elements 10.

By using crystalline highly reflective coatings on mirror elements of a deflection device according to the present invention, heat transport on the mirror coatings is increased.

According to the present invention, a deflection device for deflecting or guiding a machining laser beam with at least one deformable or movable mirror element or a laser machining head for material machining comprising the same is provided, enabling material machining at high laser power—without additional cooling devices or cooling measures.

LIST OF REFERENCE SYMBOLS 1 first layer(s)
2 second layer(s)
3 multilayer structure
4 substrate
5 mirror coating between the multilayer structure and the substrate
6 mirror coating on the substrate back side
10 mirror element
11 coupling device
12 focusing lens
13 workpiece
14 deflection device
15 machining laser beam
16 drive device
17 beam path
18 collimating lens or collimating lens system
100 laser machining head

The invention claimed is:

1. A deflection device for a laser machining head for deflecting a machining laser beam for machining a workpiece, said deflection device comprising:

at least one mirror element which is deformable and/or is movably arranged in order to direct the machining laser beam to different positions on said workpiece;

wherein said mirror element includes at least one substrate and at least one reflective multilayer structure which is arranged on said substrate and in which a plurality of first layers having first refractive indices in a first range of values and a plurality of second layers having second refractive indices in a second range of values are arranged alternately one above the other;

wherein each one of said first layers and said second layers has a crystalline structure, wherein the first refractive indices of said crystalline first layers and the second refractive indices of said crystalline second layers are different from each other, and wherein said first layers and said second layers each consist of semiconductors and comprise at least one of the following materials: binary, ternary and quaternary compounds of III-V semiconductors, II-VI semiconductors and aluminum gallium arsenide $Al_xGa_1As$ with a variable aluminum content.

2. The deflection device according to claim 1, wherein said reflective multilayer structure is arranged directly on said substrate and/or wherein said reflective multilayer structure is attached to said substrate by van der Waals forces and/or covalent bonds.

3. The deflection device according to claim 1, wherein the first refractive indices of at least two or all of said first layers are substantially the same and/or at least two or all of said first layers consist of substantially the same material and/or at least two or all of said first layers have substantially the same layer thicknesses.

4. The deflection device according to claim 1, wherein the second refractive indices of at least two or all of said second layers are substantially the same and/or at least two or all of said second layers consist of substantially the same material and/or at least two or all of said second layers have substantially the same layer thicknesses.

5. The deflection device according to claim 1, wherein said substrate comprises at least one of the following materials: silicon Si, fused silica $SiO_2$, aluminum oxide $Al_2O_3$, sapphire, and silicon carbide SiC.

6. The deflection device according to claim 1, wherein said multilayer structure has a thermal conductivity of more than 5 W/mK.

7. The deflection device according to claim 1, wherein at least one of said second layers is grown epitaxially on one of said first layers and/or wherein at least a first of said first layers is grown epitaxially on one of said second layers.

8. The deflection device according to claim 1, wherein said multilayer structure comprises more than 5, or more than 10, or more than 20 monocrystalline first and second layers and/or has a thickness of more than 0.5 μm, or more than 1 μm, or more than 5 μm.

9. The deflection device according to claim 1, wherein said multilayer structure is configured to reflect a maximum proportion of an incident electromagnetic radiation in a predetermined wavelength range.

10. The deflection device according to claim 9, wherein said multilayer structure has an absorption in the predetermined wavelength range of less than about 50 ppm, or less than about 10 ppm, and or less than about 1 ppm.

11. The deflection device according to claim 9, wherein the predetermined wavelength range is between about 900 nm and 1100 nm and/or between about 450 nm and 750 nm and/or the predetermined wavelength range is a range of 50 nm or 20 nm, centered around a machining laser wavelength.

12. The deflection device according to claim 1, wherein the first range of values of the first refractive indices lies between about 1.8 and 5.5 and the second range of values of the second refractive indices lies between about 1.2 and 4.6.

13. The deflection device according to claim 1, further comprising at least one mirror coating, wherein:

said at least one mirror coating comprises a dielectric and/or a metallic layer;

said at least one mirror coating is arranged between said multilayer structure and said substrate and/or on a surface of said substrate facing away from said multilayer structure; and said at least one mirror coating is reflective for a different wavelength range than said multilayer structure.

14. The deflection device according to claim 1, further comprising at least one drive device configured to rotate about at least one axis and/or laterally displace and/or deform said mirror element.

15. The deflection device according to claim 14, wherein said drive device comprises at least one actuator, a piezoelectric actuator, a voice coil actuator, a galvo actuator and/or a microelectromechanical system, MEMS.

16. A laser machining head for machining a workpiece, comprising:

a coupling device for coupling a machining laser beam into a beam path of said laser machining head;

at least one lens or a lens system for focusing the machining laser beam onto said workpiece; and at least one mirror element for deflecting the machining laser beam;

wherein said mirror element includes at least one substrate and at least one reflective multilayer structure which is arranged on said substrate and in which a plurality of first layers having first refractive indices in a first range of values and a plurality of second layers having second refractive indices in a second range of values are arranged alternately one above the other, and wherein the first refractive indices of said crystalline first layers and the second refractive indices of said crystalline second layers are different from one another, wherein each one of said first layers and said second layers has a crystalline structure, and wherein said first layers and said second layers each consist of semiconductors and comprise at least one of the following materials: binary, ternary and quaternary compounds of III-V semiconductors, II-VI semiconductors and aluminum gallium arsenide $Al_xGa_1As$ with a variable aluminum content.

* * * * *